UNITED STATES PATENT OFFICE.

JULIA A. KING, OF SHERMAN, TEXAS.

COUGH-MEDICINE.

SPECIFICATION forming part of Letters Patent No. 234,785, dated November 23, 1880.

Application filed September 8, 1880. (No specimens.)

*To all whom it may concern:*

Be it known that I, JULIA ANN KING, of Sherman, Grayson county, State of Texas, have invented a new and Improved Cough-Medicine, of which the following is a specification.

The object of my invention is to provide a new and improved cough-medicine which is simple in composition and effective and reliable in use.

My composition consists of the following ingredients mixed and combined in the manner and proportions specified:

One pound of Indian pleurisy-root (*Asclepias tuberosa*) is boiled in one gallon of pure rain-water until the same is reduced to one quart, upon which one-half ounce of saltpeter (nitrate of potash) is added while hot. Two parts of this decoction are then mixed with one part each of strained honey while hot and pure French brandy after cooling.

The dose for adults is a tea-spoonful every two to four hours; for children, ten to thirty drops in the same time.

This medicine will relieve persons affected with a cough, in diseases of the throat or lungs.

Having thus described my invention, I claim as new and desire to secure by Letters Patent—

The herein-described cough-medicine, consisting of a decoction of Indian pleurisy-root, (*Asclepias tuberosa*,) saltpeter, honey, and brandy in the proportions specified.

JULIA ANN KING.

Witnesses:
  S. C. NISBET,
  S. RICHARDS.